J. S. Lloyd,

Hay Elevator,

No. 2,360, Reissued Sept. 18, 1866.

No. 6.

Witnesses;
Geo R Morrisons
Josiah D Evans

Inventor;
John S Lloyd

AM. PHOTO-LITHO. CO. N.Y. (OSBORNE'S PROCESS.)

UNITED STATES PATENT OFFICE.

JOHN S. LLOYD, OF SALEM, NEW JERSEY.

IMPROVEMENT IN HAY-HOISTING MACHINES.

Specification forming part of Letters Patent No. 27,994, dated April 24, 1860; Reissue No. 2,360, dated September 18, 1866.

*To all whom it may concern:*

Be it known that I, JOHN S. LLOYD, of Salem, in the county of Salem and State of New Jersey, have invented a new and useful Improvement in Machinery for Elevating and Hoisting Hay and depositing the same in any place desired; and I do hereby declare that the following is a full, clear, and exact description thereof, which will enable others skilled in the art to make and use the same, reference being had to the accompanying drawings, forming a part of this specification, in which—

Figure 1:
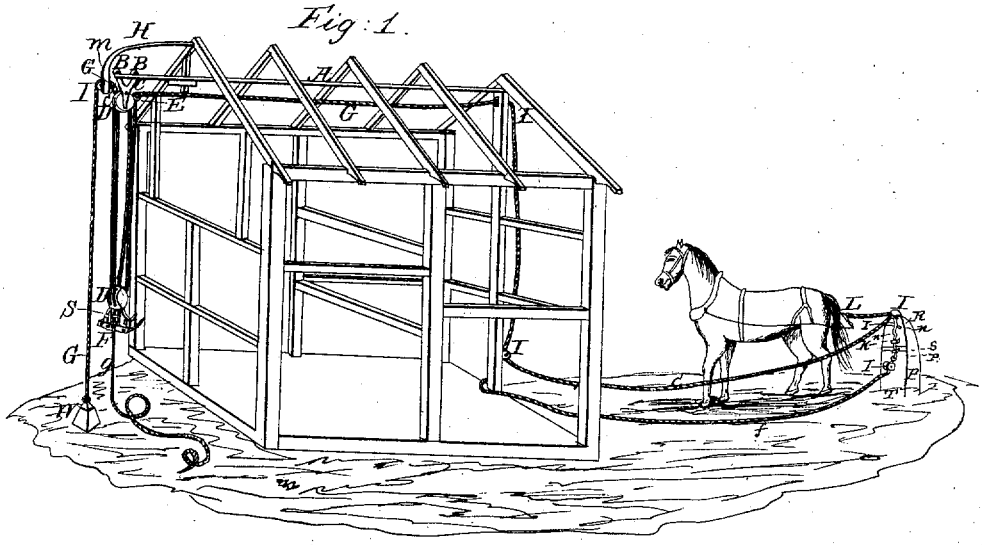

Figure 1 is a perspective view of the machinery as seen in operation, in which A represents an inclined single-rail railway attached to the rafters of a barn or other building, near the peak, or to a frame overhead, by framework. (Shown at B in Fig. 3.) On the upper side of this rail is a groove or gutter, in which the wheels B B, attached to the blocks D D, move to convey the hay, grain, or other material to or over any part of the barn or other place required. Upon the axles of these wheels are placed the arms C C, which are connected together at the bottom, and form part of, or are firmly secured to, the side of the upper double block D. Upon the upper part or top of this block are firmly fastened the two arms E E, which terminate in loops, to which are attached the ropes G G, the forward one of which passes around the pulleys in the blocks D D, under the railway A to the opposite end of the building or frame, over the pulley I, and under the lower pulley I, to the single-tree L, to which the horse is harnessed. The rope attached to the other arm E passes over the pulley I at the lower end of the railway, and is fastened to the weight W, to pull back the wheels B B after the fork or bucket has discharged its load.

To the lower block D is attached the fork F, by means of a joint or hinge, which allows it to move forward freely.

The fork is kept in its place and prevented from discharging prematurely by a bolt or slide, K, placed upon the handle or shank of the fork, and confined to its place by loops or clasps, which allow it to have a slight motion along the shank. The head of this slide is beveled upon one side, and on the other is fitted into a notch, *n*, in the lower end of the lower block D. A spring, S, placed either in the handle or head of the fork, keeps the slide in its place.

To the lower end of the slide a rope or cord is attached, by means of which the slide can be drawn from the notch *n* and the load discharged at any given point.

The lower or outer end of the railway A is supported by a stout iron strap, H, one end of which is fastened to the end of the railway and the other end is firmly bolted to the rafters at the apex. Where the machinery is used in a frame instead of a building the lower end of the railway should be supported by a post firmly placed on the ground instead of this strap. At the opposite end of the building or frame are two pulleys, I I, placed nearly under the railway. The rope G passes over the upper pulley, which is near the railway, perpendicularly down under the lower pulley, which is placed near the ground, to the single-tree L, to which the horse is attached. Immediately in front of this, and at half the distance from it required to be traversed by the horse in raising the weight, a stout box is sunk into the ground, into which the bottom of the post P is fitted. By this arrangement the post can be readily taken away when not in use. The back part of this post is beveled toward the top, so that the rope in passing around it is thrown into the groove of the pulley I, placed on the upper end of lever R, which works in a hollow in the upper end of the post P, to which it is attached by a pin or bolt, upon which it turns forward. The outer part of the lower end of this lever is beveled, and the inner part is notched at *n*, so as to fit against the front of the upper part of the slide K, which is attached to the front of the post P by clasps which allow it to work perpendicularly. The head of this slide is beveled on the inside. When the slide is in its proper position the head or upper end of it fits into the notch *n* in the lever R, and prevents the bottom of it from moving inward. It is kept to its place by a spring, S, which passes through the post at P into a notch or hole in the slide. This spring is kept to its place by a wedge half its length inserted in the post P beneath it, and made to fit tightly.

A rope, *f*, is attached to the lower end of the slide, and passes under the pulley I, placed in front of the post near the bottom, by means of which the slide K is drawn down and the head of the lever R allowed to move forward and liberate the rope G without having to back the horse.

A broad band, *b*, passes around the back and sides of the upper part of the post P, which serves the double purpose of strengthening the post and furnishing a firm support for the pin or bolt upon which the lever R turns.

Figure 2:
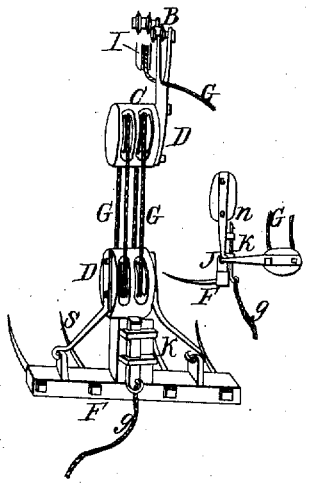

Fig. 2 represents a back and lateral view of the fork F, blocks D D, slide K, joint J, notch *n*, and cord *g*.

Figure 3:
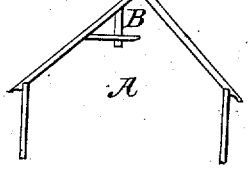
Figure 4:
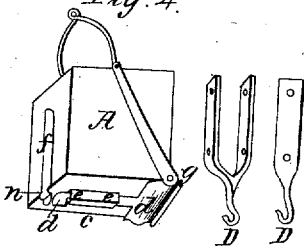
Figure 5:
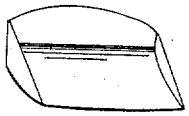
Figure 5:
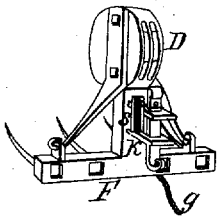

In Fig. 3, A represents the end of the barn, and B the means or device by which the railway is connected with the rafters of the building or with a frame, so as to allow the wheels B B, Fig. 1, to work upon the railway free from all obstruction.

Operation: In unloading hay the fork F is dropped upon the load standing under the lower end of the railway, and filled with hay by pressing the fingers of the fork into the load or otherwise. The horse attached to the rope G at L is then started forward, drawing up the fork F until the blocks D D come together, when the wheels B B are drawn forward up the inclined railway, carrying along the fork and hay. When at the desired point the rope *g*, attached to the slide K in the fork F, is pulled, when the fingers of the fork turn and the hay slips off by its own weight. In drawing up the fork the horse passes around the post P and returns to the place of starting. When the contents of the fork or bucket are discharged, the cord *f*, attached to the slide in the post P, is pulled, and the rope G, which had passed around the post, and guided by the beveled back into the groove of the pulley I at the top of the post, draws the upper end of the lever R forward, allowing the rope to pass out of the groove in the pulley and become slack, when the weight W draws the wheels B B down the inclined railway to the lower end of it, when the fork F again drops upon the load by its own weight. The lower end of the lever R being heavier than the upper, it returns to its proper position when released from the rope by passing over the beveled head of the spring S and forcing it downward, either by its own force or that of a person, until the spring again moves up into the notch *n*. By holding the spring down by the cord *f* until the lever had fallen back to its place, the result would be most readily accomplished.

I do not claim the invention of blocks, pulleys, forks, or railways for raising hay or other material.

Having thus described my invention, what I claim as new, and desire to secure by Letters Patent, is—

1. An elevated way or railroad, A, in combination with a hoisting or horse hay fork, F, arranged to operate in the manner substantially as herein shown and described.

2. The construction, combination, and arrangement of the forks, cords, levers, pulleys, springs, and railways, the arms E E to the block D, and the mode of attaching and supporting the railway to the barn or frame, so as to allow the wheels B B, with the attached blocks and fork, to pass freely along the length of the rail.

3. The post P, as constructed, in combination with the pulley, lever, slide, spring, and cord.

The above specification of my invention signed by me this 23d day of February, 1866.

JOHN S. LLOYD.

Witnesses:
M. M. LIVINGSTON,
ALEX. F. ROBERTS.